United States Patent [19]

Bramblet

[11] Patent Number: 5,056,758

[45] Date of Patent: Oct. 15, 1991

[54] VALVE STEM PACKING STRUCTURE

[76] Inventor: John W. Bramblet, 5600 Harvey Wilson Dr., Houston, Tex. 77020

[21] Appl. No.: 522,104

[22] Filed: May 11, 1990

[51] Int. Cl.$^5$ .................. F16K 41/04; F16J 15/20; F16J 15/40

[52] U.S. Cl. .................. 251/214; 277/59; 277/72 FM; 277/112; 277/124; 277/125; 277/141; 277/205; 277/235 R

[58] Field of Search .......... 251/214; 277/59, 72 FM, 277/110, 112, 123, 124, 125, 141, 188 A, 205, 235 R

[56] References Cited

U.S. PATENT DOCUMENTS

| 201,683 | 3/1878 | Kearney | 277/124 |
|---|---|---|---|
| 2,504,936 | 4/1950 | Payne | 277/59 |
| 4,177,998 | 12/1979 | Laitkep et al. | 277/124 |
| 4,364,542 | 12/1982 | Meyer | 251/214 |
| 4,379,557 | 4/1983 | Saka | 251/214 |
| 4,475,712 | 10/1984 | DeJager | 251/214 |
| 4,510,966 | 4/1985 | Parsons, Jr. | 251/214 |
| 4,886,241 | 12/1989 | Davis et al. | 251/214 |

FOREIGN PATENT DOCUMENTS 259319  3/1912  Fed. Rep. of Germany ........ 277/59

Primary Examiner—George L. Walton

[57] ABSTRACT

A packing for sealing between a valve stem 31 and valve bonnet 21 which receives the valve stem in a bore 34 formed therein. The packing is accommodated in a packing chamber 41 formed in the valve stem bore 34 which comprises a lower set of packing rings 51 in stacked coaxial relation about the valve stem and a second upper set of packing rings 55 similarly arranged in the upper portion of the packing chamber. A spring means 61, 62, 63 comprising at least one frusto-conical washer is interposed in the packing chamber 41 between the sets of packing rings for axial compression of the upper and lower sets of packing rings to thereby urge the radial expansion of the packing rings and provide an enhanced and substantially uniform sealing effectiveness of the packing rings. A lateral port 68 in the valve bonnet 20 opens between the sets of packing rings and at its outer end is provided with a pressure fitting 70 which may be connected to a leak detecting sensor or alternatively to an external source of injectable sealing substance. A notch in one of said washers allows pressurized sealing material injected through said port to fill the annuluses between the washers and valve stem and between the washers and wall of the stem bore to enhance the sealing effectiveness of the packing.

10 Claims, 2 Drawing Sheets

VALVE STEM PACKING STRUCTURE

FIELD OF THE INVENTION

The invention relates to a packing structure for sealing an annulus between cylindrical surfaces of relatively movable members, and more particularly to a valve stem packing for sealing between a valve stem and the housing which receives the valve stem therein.

BACKGROUND OF THE INVENTION

Packing assemblies for sealing an annulus between the cylindrical surfaces of relatively movable members, such as a valve stem and a valve bonnet, commonly employ layers of packing rings which when subjected to axial compression are urged to expand radially into sealing engagement with the enclosing cylindrical surfaces. It is also a common practice to provide for two such sets of packing rings in tandem array separated by a lantern ring which is connectable through a pressure fitting in an accommodating port in the valve bonnet, to a fluid sensor or an external source of fluid lubricant or other injectable substance such as a sealing plastic to enhance sealing effectiveness. In assembly of valves, it is also a frequent practice to place the valve stem packings in a preloaded condition prior to use in order that a seal can be established at low fluid pressures as the pressure builds in the valve. Frusto-conical spring washers or belleville springs located at one end of a stack of packing rings are a conventional means for imparting an axial compression of the packing rings and a pre-loading of the packing structure. The springs also function to maintain an axial loading on the packing assembly should there be some loss or extrusion of the packing ring material.

It has been observed, however, that the loading placed on the packing rings by the belleville springs when located at an end of a stack of packing rings does not result in uniform sealing effectiveness for the several packing rings. The packing ring adjacent to and those nearest a belleville spring receive a greater axial and radial loading than those more remote from the belleville springs with a consequent reduction in the sealing effectiveness of the more remote rings and in the reliability and effectiveness of the packing assembly as a whole.

SUMMARY OF THE INVENTION

The invention relates to a packing structure for sealing between a valve stem and the valve bonnet or valve housing which receives the valve stem in a stem-receiving bore formed therein. The packing structure is accommodated in a packing chamber formed by the valve stem bore which terminates at its lower end in a packing stop provided by a stop ring or an annular shoulder in the bore facing away from the flow passage. At its upper end, a similar packing stop is provided. The packing structure comprises a first lower set of packing rings arranged within the packing chamber in stacked coaxial relation about the valve stem and a second upper set of packing rings arranged in the upper portion of the packing chamber in stacked coaxial relation about the valve stem. A spring of frusto-conical washers, each notched in the periphery thereof, means is interposed in the packing chamber in a space between the upper and lower sets of packing rings for exerting a force for axial compression of the lower set of packing rings against the lower packing stop and a force for axial compression of the upper set of packing rings against the upper packing stop to thereby urge the radial expansion of the packing rings and provide an enhanced and substantially uniform sealing effectiveness of the packing rings. To allow for the detection of fluids which may leak past the packing rings into the space between the sets of packing rings, a lateral port may be provided by a bore in the valve bonnet which opens into said space and at its outer end is provided with a pressure fitting which may be connected to an appropriate detecting sensor. It may alternatively be connected to an external source of fluid lubricant or other injectable substance such as a sealing plastic to enhance the sealing effectiveness of the packing.

DETAILED DESCRIPTION OF THE INVENTION

Figure 1:
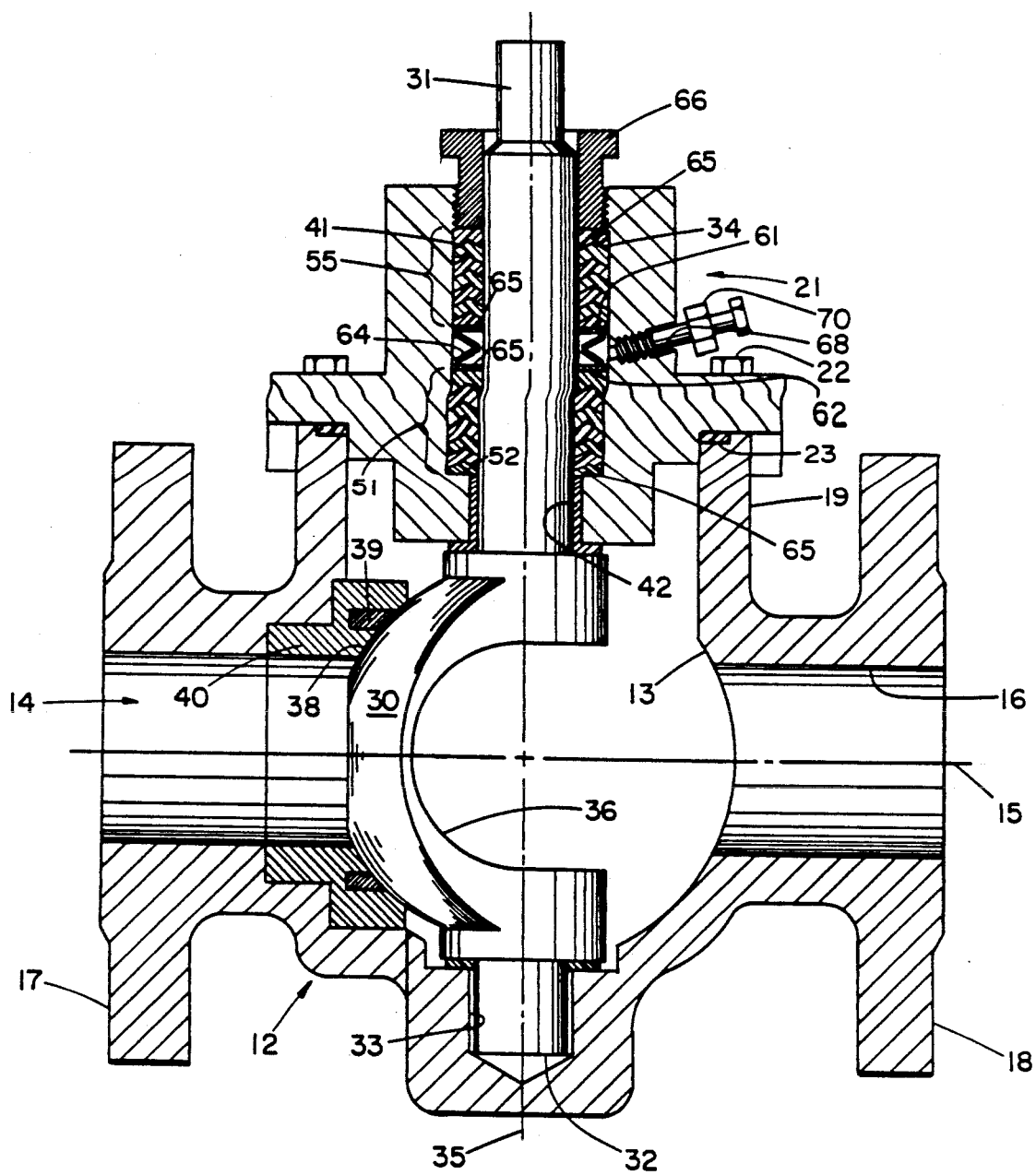
FIG. 1 is a sectional view of an eccentric ball valve which is provided with a valve stem packing assembly constructed in accordance with a preferred embodiment of the invention.

Referring more particularly to the drawings, there is shown in FIG. 1, a valve 10 of the eccentric plug valve type, part of which is cut away in the drawing to show details of the valve. The valve 10 comprises a valve body 12 with a valve chamber 13 defined therein. The valve body 12 is provided with an inlet port 14 and an outlet port 16 formed identically thereto which are in fluid communication with the valve chamber 13 and aligned therewith along an axis 15 to provide a flow passage through the valve. The bores defining the ports 14,16 may be internally threaded for facilitating connection of the valve 10 in a pipe line provided with accommodating external threads. However, the valve body 12 could also be welded into the pipeline or provided with annular end flanges 17,18 about the ports 14,16 respectively, for making flanged connections to the pipeline.

The valve body 12 is further provided with a tubular extension 19 which extends transversely with respect to the flow passage through the valve and is provided at its outer end with an annular end surface 20. A valve bonnet 21, bolted to the end surface 20 by means of bolts 22 closes the opening to the valve chamber provided by the tubular extension 19. An annular seal 23 seated in an accommodating annular groove in the end surface 20 of the tubular extension 19 is clamped by the bonnet 21 and provides a fluid-tight, gas-tight seal between the bonnet 21 and the valve body 12.

The valve 10 is further provided with a plug valve element 30 which is rotatably mounted within the valve chamber 13 and adapted to be rotated between open and closed positions with respect to the flow passage. For this purpose, the valve element 30 is provided with a valve stem 31 and a lower trunnion 32 which is received in a bore 33 formed in the valve body 12. The valve stem 31 is coaxially aligned with the trunnion 32 and extends through an axial bore 34 provided through the valve bonnet 21. The respective bores 33,34 are aligned on an axis 35 in intersecting perpendicular relationship with the flow axis 15. By means of an actuator, such as a handwheel (not shown) affixed to the valve stem 31, the valve element 30 can be rotated to its open and closed positions.

The plug valve element 30 is an eccentric plug valve element, having a general "C" shape in vertical cross-section and being provided with a central opening 36 of corresponding configuration. In cross-section, the arcuate portion of the opening 36 conforms in dimension to the flow passage defined by the valve ports 14,16. The valve element 30 is also formed with an external sealing surface 38 configured as a segment of a sphere generated about a point located eccentrically with respect to the axis 35 which is coincident with the axes of the trunnion 32 and valve stem 31.

When the valve element 30 is rotated to its valve closed position as shown in FIG. 1, the sealing surface 38 of the valve element is in sealing engagement with a sealing ring 39 seated in an accommodating annular groove formed in a seat ring 40 which is mounted in the valve body in encircling relation to the flow passage through the valve. In the valve open position, the valve element 30 is in unobstructing position in relation to the flow passage through the valve with its central opening 36 aligned with the inlet and outlet ports 14,16 of the valve.

The bonnet bore 34 which receives the valve stem 31 is formed with an enlarged diameter portion suitable as a packing chamber 41 for receiving a valve stem packing structure therein and a reduced diameter portion 42 which receives an annular bearing 45.

The valve stem packing structure for the valve 10 comprises a first lower set of packing rings 51 which are preferably of V-type configuration in radial cross-section providing a convex surface and a concave surface. The packing rings are arranged in internested coaxial relationship in a stack encircling the valve stem 31.

The packing structure also includes a second set of packing rings 55 which are preferably of V-shape configuration in radial cross-section and arranged in internested coaxial relationship similar to the arrangement of the lower set of packing rings. Each set of packing rings also includes an adapter ring 65 located at each end of the stack to provide flat surfaces for engaging packing stops, and retainer washers 61,62, to be hereinafter described. The adapter rings, which may be of the same packing material as the other packing ring but may also be metallic, also have V-shaped surfaces for conforming engagement with the packing ring adjacent thereto.

The upper and lower sets of packing rings are arranged in tandem array about the valve stem 31 but separated by a spring assembly which comprises a pair of flat washers 61,62 and a pair of spring washers 63,64 sandwiched therebetween. The washer 61 serves as a retainer ring in abutting engagement with the lower adapter ring 65 of the upper set of packing rings and the washer 62 serves as a retainer ring in abutting engagement with the uppermost adapter ring 65 of the lower set of packing rings. In conventional fashion, the packing rings in both sets of rings are disposed in the packing chamber with all their concave surfaces facing in the direction of fluid pressure from the flow passage. However, for other applications, the rings of one or both sets may be oriented with their concave surfaces facing away from the flow passage.

The spring washers 63,64 are conventional belleville spring washers of frusto-conical configuration arranged in sleeved relation about the valve stem 34 with their annular inner edges in abutting engagement to one another. The outer annular periphery of the uppermost spring washer abuts the upper flat washer 61 and the outer annular periphery of the lower spring washer abuts the lower flat washer 62.

An upper packing stop is provided by a packing gland 66 sleeved about the valve stem 31 and threaded into the upper end portion of the valve stem bore 34 which is appropriately provided with internal threads. The annular bore shoulder 52 serves as a lower packing stop. It will thus be apparent that threading the packing gland 66 into the stem bore 34 will effect an axial compression of the packing structure. Alternatively, a bolted gland flange or other method of effecting axial compression might be employed. However, the packing structure is placed in a preloaded condition by means of the spring washers which apply an axial compressive force to both sets of packing rings.

The dimensions of the packing rings are such that their inner peripheral edges are in conforming engagement with the surface of the valve stem 31 and their outer peripheral edges in conforming engagement with the cylindrical wall of the valve bonnet which defines the stem bore 34. The dimensions of the spring washers are such that their inner and outer diameters are less than the diameters of the valve stem and the bore 34, respectively, so that the washers 63,64 do not normally engage either the valve stem or the bonnet when in their pre-loading condition. In their pre-loading condition, the spring washers apply an axially compressive force to both sets of packing rings which urges a radial expansion of the packing rings into tight sealing engagement with the valve stem and the wall of bore 34. Because of their location in a space intermediate the sets of packing rings rather than at one end or the ends of a stack of packing rings, a greater uniformity is provided in the forces urging radial expansion of the packing rings and the sealing effectiveness of the individual packing rings, thus enhancing the reliability and effectiveness of the packing structure.

While the packing rings in the packing structure described herein are disclosed as being of the chevron type with V-shape configuration in radial cross-section, packing rings of other cross-sectional configurations might also be employed. The materials for the packing rings may be of elastomeric or polymeric substances or other conventional packing materials appropriate for sealing under low or high temperatures. The two sets of rings might also be of a high temperature resistant material, such as a graphite composition. Either or both of the sets might also be metallic.

The valve bonnet 21 is provided with a lateral port 68 formed by a bore which opens into the packing chamber 41 in the space between the sets of packing rings and at its outer end is internally threaded for accommodating a pressure fitting 70. The fitting 70 is adapted for connection to a sensor appropriate for detecting the presence of fluids which may have leaked past the packing rings into the annular space which receives the spring washer assembly. The fitting 70 is also suitable for connection to an external source of fluid lubricant or other substance such as a sealing plastic which can be injected under pressure into the packing chamber to enhance the sealing effectiveness of the packing rings.

Figure 2:
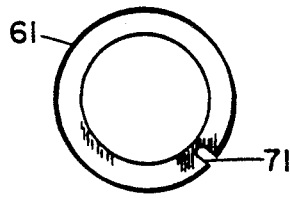
FIG. 2 is a top plan view of one of the washers in a spring assembly which is arranged to impose a pre-loading condition on the packing structure of the embodiment of the invention in FIG. 1.

As shown in FIG. 2, a washer of the spring assembly such as the washer 61 is provided with a radially extending groove or notch 71 in its outer periphery which facilitates fluid communication between the annular space defined by the cylindrical wall of the bore 34 and the outer surfaces of the washers in the spring assembly and the annular space defined by the cylindrical surface of the valve stem 31 and the inner surfaces of the spring washer assembly. Preferably, any one or all of the frusto-conical spring washers are similarly notched or otherwise provided with an opening intermediate its inner and outer peripheries.

Figure 3:
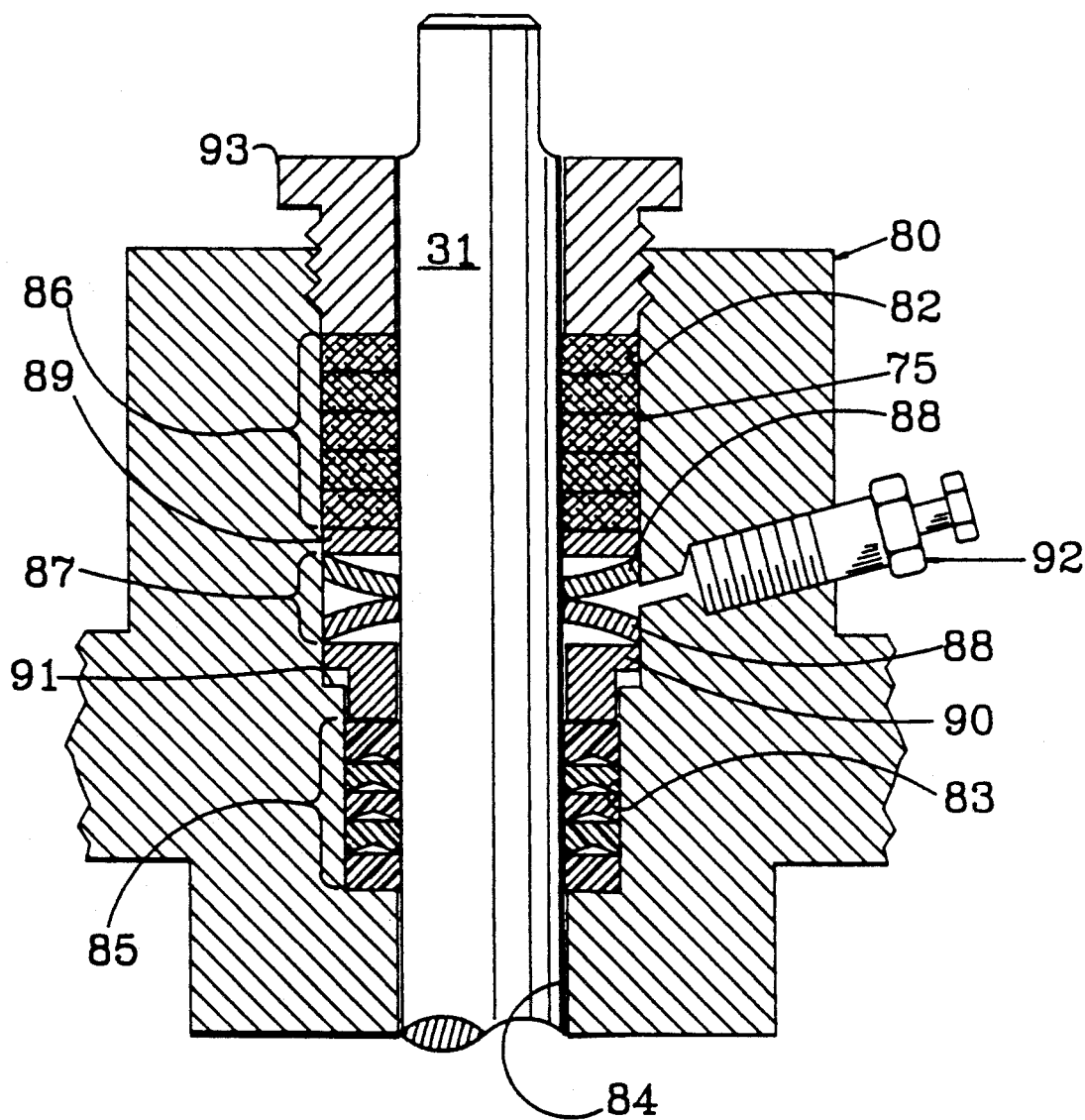
FIG. 3 is an enlarged view of an alternative form of valve stem packing which represents a modified form of the invention.

An alternative valve stem packing assembly 75 representing a modified form of the invention is shown in FIG. 3. The packing assembly 75 is a "fire-resistant" packing particularly adapted for providing a valve stem seal at both relatively low temperature normal operating conditions and also at abnormally high temperature conditions. For this embodiment of the invention, the valve bonnet 80 mounted on the valve 10, is provided with a valve stem bore which extends therethrough and includes an enlarged diameter section 82, an intermediate diameter section 83, and a smaller diameter section 84 which opens into the valve chamber 13. The packing structure 75 includes a first lower set of packing rings 85 of elastomeric material and cup-like configuration, each having a conical concave surface at one end and a flat surface at the other except for the lowermost ring which is formed with flat end surfaces. The rings 85 are stacked in the intermediate stem bore section 83 with their concave surfaces facing towards the valve chamber 13.

The packing structure 75 also includes a second set of packing rings 86 of high temperature resistant material, such as GRAFOIL, a graphite composition able to withstand high temperatures typically far in excess of 1000° (538° C.). The packing rings 86 are disposed within the enlarged diameter stem bore section 82.

As with the packing structure in FIG. 1, the two sets of rings are arranged in tandem array about the valve stem 31 and separated by a spring assembly 87 of belleville spring washers 88 also located in the stem bore section 82 and arranged with their inner edges in abutting engagement. A flat metallic washer 89 is provided at the upper end of the spring assembly 87 and a metallic retainer ring or packing support ring 90 is provided at its lower end. The support ring 90 permits the high temperature packing to remain energized and maintain a seal in the event of decomposition of the lower set of packing rings due to the abnormally high temperatures. An annular flange of the retainer support ring 90 is adapted to abut an upward facing shoulder 91 formed at the junction of the stem bore sections 83,84 and thereby retain the upper packing rings should there be a subsequent cooling of operating temperature.

A packing gland 93, which may be identical to the packing gland 66 in the packing assembly of FIG. 1, is threaded into the upper end of the stem bore 81 about the valve stem 31 to serve as an upper packing stop and also to apply an axial pre-load force to the packing assembly. However, a bolted gland flange or other means for effecting axial compression might be employed.

In their pre-loading condition, as in the packing structure of FIG. 1, the spring washers 88 apply an axially compressive force to both sets of packing rings 85,86 which urges a radial expansion of the packing rings into tight sealing engagement with the valve stem and the wall of bore 81. Because of the location of the spring assembly 87 in a space intermediate the sets of packing rings 85,86 rather than at one end or the ends of a stack of packing rings, a greater uniformity is provided in the forces urging radial expansion of the packing rings and the sealing effectiveness of the individual packing rings, thus enhancing the reliability and effectiveness of the packing structure.

The packing structure of FIG. 3 is particularly suited for providing a valve stem seal when the valve is operating under relatively low or normal temperature operating conditions, as for example, a range of −375° F. (−226° C.) and 250° F. (121° C.), and also when operating at temperatures in a range above 250° F. (121° C.) to far in excess of 1000° F. (538° C.). Similar to the valve bonnet 21, the bonnet 80 may be provided with a lateral port which opens into the packing chamber and at its outer end accommodates a pressure fitting 92 which is adapted for connection to a sensor for detecting the pressure of leakage fluids in the annular space which receives the spring assembly 87 or to an external source of fluid lubricant or sealing material. The flat washer 89 is also radially notched in the same manner as the washer 61 in the embodiment of FIG. 1.

It will therefore be seen that a unique valve stem packing structure is disclosed herein which by virtue of a spring washer assembly positioned intermediate a tandem array of sets of packing rings for imposing axially compressive forces thereon, a significantly more uniform pre-loading and sealing capability of the several packing rings is achieved.

While the foregoing description of the invention has been presented for purposes of description and explanation, it is to be understood that it is not intended to limit the invention to the precise form disclosed. For example, the number of frusto-conical spring washers may be more or less than two in number. The packing structure of the invention is also appropriate as a valve stem seal for valves other than an eccentric plug valve such as a gate valve or ball valve and for use in valves of the rising stem type as well as the non-rising stem types. It is to be appreciated therefore, that various structural changes may be made by those skilled in the art without departing from the invention.

I claim:

1. A packing structure for use in a valve having a valve body with a fluid flow passage, a valve element mounted for movement between an open position and a closed position relative to the flow passage, and a movable valve stem connected with the valve member and extending through a valve stem bore in the valve body and a packing chamber formed by an enlargement of said bore for effecting movement of the valve element between the open and closed positions, said packing structure comprising:

a first lower set of packing rings arranged within said bore enlargement in stacked coaxial relationship about said valve stem;

a second upper set of packing rings arranged within said packing chamber in stacked coaxial relationship about said valve stem, said packing chamber including a lower packing stop provided in said bore and at its upper end an upper packing stop provided in said bore;

spring means in said packing chamber in a space between said upper and lower sets of packing rings for exerting a force for axial compression of said lower set of packing rings against said lower packing stop and a force for axial compression of said upper set of packing rings against said upper packing stop to thereby urge the radial expansion of said packing rings and provide an enhanced substantially uniform sealing effectiveness of the packing rings, said spring means comprising at least one spring washer of frusto-conical configuration positioned between said retainer rings in encircling sleeved relation with said valve stem for exerting an axially compressive force on each set of packing rings;

said valve bonnet being provided with a port formed by a passage through the wall thereof which communicates with said spring means in said packing chamber in the space between said upper and lower sets of packing rings, and a pressure fitting provided in the outer end of said passage for allowing the detection of fluid leakage past said packing rings into said space or the selective pressurized injections of a sealing material or fluid into said space;

at least one of said spring washers being provided with a notch therein allowing communication between said port and the annulus defined by the valve stem and the inner surfaces of said frusto-conical washer and between said port and the annulus defined by the wall of said valve stem bore and the outer surfaces of 45 said spring washers whereby said pressurized sealing material is allowed to fill said annuluses to enhance the uniform sealing effectiveness of the packing rings; and means for axially compressing said upper and lower sets of packing rings and said spring means for preloading both sets of said packing rings and for inducing an internal spring loaded force for axial compression of said sets of packing rings.

2. A packing structure as set forth in claim 1 wherein said spring means for exerting an axial compressive force on said packing rings includes a first flat retainer ring disposed within said space about said valve stem and in abutting engagement with said upper packing rings, a second flat retainer disposed within said space about said valve stem and in abutting engagement with said lower packing rings, and at least one spring washer of frusto-conical configuration positioned between said retainer rings in encircling sleeved relation with said valve stem for exerting an axially compressive force on each set of packing rings.

3. A packing structure as set forth in claim 2 wherein both said flat retainer rings are provided with a radially extending notch or slot opening therein intermediate its inner and outer peripheral edges for allowing communication between said port and the annulus defined by the valve stem and the inner surfaces of the frusto-conical spring washers.

4. A packing structure as set forth in claim 1 wherein each of said packing rings in said lower set are of V-type configuration in radial cross-section with a convex surface and a concave surface and are arranged in internested coaxial relationship in a stack about the valve stem in contacting relation with the stem and bonnet, and each of said packing rings in said upper set are of V-type configuration in radial cross-section with a convex surface and a concave surface and arranged in internested coaxial relationship in a stack about the valve stem in contacting relationship with the stem and bonnet.

5. A packing structure as set forth in claim 4 wherein said valve is a ball valve.

6. A packing structure as set forth in claim 4 wherein said valve is a gate valve.

7. A packing structure as set forth in claim 4 wherein said packing rings are formed of elastomeric or polymeric materials.

8. A packing structure as set forth in claim 4 wherein said upper and lower sets of packing rings are disposed in said packing chamber with all the concave surfaces of the packing rings facing in the direction of fluid pressure from said flow passage.

9. A packing structure as set forth in claim 2 wherein said upper set of packing rings are of high temperature resistant material for providing a seal at high temperature operating conditions in the range of 121° C. to 538° C. and said lower set of packing rings are of polytetrafluoroethylene composition for providing a seal at operating temperatures in the range of −226° C. to 121° C.

10. A packing structure as set forth in claim 9 wherein said upper set of packing rings are of graphite composition.

* * * * *